United States Patent [19]
Fukaumi et al.

[11] Patent Number: 5,951,840
[45] Date of Patent: *Sep. 14, 1999

[54] HEAT RESISTANT CONDUCTING POLYMER, SOLID ELECTROLYTIC CAPACITOR USING THE SAME AND METHOD FOR FABRICATING SUCH CAPACITOR

[75] Inventors: Takashi Fukaumi; Toshihiko Nishiyama; Atsushi Kobayashi; Masashi Ohi; Eishun Tsuchida; Kumihisa Yamamoto; Shinji Takeoka; Yoshitaka Fujishima, all of Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/580,367

[22] Filed: Dec. 28, 1995

[30] Foreign Application Priority Data

Dec. 28, 1994 [JP] Japan .................................... 6-327911

[51] Int. Cl.$^6$ .............................. C25D 11/04; H01G 9/04
[52] U.S. Cl. .......................... 205/173; 205/317; 427/80; 29/25.03; 361/525
[58] Field of Search ............................. 252/500; 528/205, 528/210, 377, 423; 29/25.03; 361/525; 205/317, 173; 427/80

[56] References Cited

U.S. PATENT DOCUMENTS

| | | | |
|---|---|---|---|
| 5,112,450 | 5/1992 | Jasne | 205/419 |
| 5,120,407 | 6/1992 | Kim et al. | 205/419 |
| 5,126,017 | 6/1992 | Nakama et al. | 205/419 |
| 5,331,287 | 7/1994 | Yamagishi et al. | 204/421 |

FOREIGN PATENT DOCUMENTS

| | | |
|---|---|---|
| 3-127813 | 5/1991 | Japan . |
| 4-315412 | 11/1992 | Japan . |
| 4-315413 | 11/1992 | Japan . |

OTHER PUBLICATIONS

Caplus 1994: 643, 679 Equivalent to JP 06–204,093 of Jul. 1994.

Primary Examiner—K. Mayekar
Attorney, Agent, or Firm—Young & Thompson

[57] ABSTRACT

The solid electrolytic capacitor comprises a sealed capacitor element having, as a solid electrolyte layer, a heat resistant conductive layer formed on a dielectric oxide film. The heat resistant conducting polymer layer contains water, and the capacitor element inside is substantially oxygen-free. A cathode conductive layer is provided on the capacitor element and then both an external cathode lead and an external anode lead are mounted on the capacitor element. Water is supplied to the conducting polymer layer of the capacitor element such that the conducting polymer layer inside contains water. The capacitor element is then sealed such that water is held within the heat resistant conducting polymer layer and that the capacitor element inside is substantially oxygen-free. The step of supplying water is carried out by dipping the heat resistant conducting polymer layer in water or heavy water or exposed to water-containing inert gas. The capacitor element is sealed in a water-containing oxygen-free inert gas atmosphere. The resulting capacitor has excellent heat resistance.

7 Claims, 2 Drawing Sheets

HEAT RESISTANT CONDUCTING POLYMER, SOLID ELECTROLYTIC CAPACITOR USING THE SAME AND METHOD FOR FABRICATING SUCH CAPACITOR

BACKGROUND OF THE INVENTION (1) Field of the Invention

The present invention relates to conducting polymers whose optical, electronic and electro-magnetic properties are extensively utilized in electronic devices, such as capacitors, diodes, display elements, batteries, sensors, etc., and more particularly to conducting polymers with the heat resistance thereof improved by blocking contact with oxygen, solid electrolytic capacitors using such heat resistant conducting polymers, and a method for fabricating the same.

(2) Description of the Related Art

Conductive polymers well known in the art are ones which are obtainable through chemical oxidization polymerization or electrolytic oxidization polymerization of aromatic hydrocarbons and like $\pi$ electron conjugated compounds. One of the important uses of these conducting polymers is for the electrolyte layer of solid electrolytic capacitors which use as dielectric layer an anodic oxide film of a valve action metal, for instance, tantalum. For this purpose, manganese dioxide, for instance, obtainable through pyrolysis of manganese nitrate, has been extensively used. Manganese dioxide, however, has comparatively low electric conductivity. In addition, the large amount of heat that is generated when it is formed, may cause damage to the dielectric oxide film. In contrast, the conducting polymer described above does not require high heat for its formation and also has good electric conductivity, so that recently it has been extensively used for solid electrolytic capacitors.

Conductive polymers, however, are anion-doped and highly oxidized, and they have a character that their extreme structural changes are caused by cooperative external excitements by heat, oxygen, light, water, etc. so that it is difficult to maintain their stable high conductivity for long time. Particularly, their conductivity is reduced extremely at high temperatures, and it is well known in the art that their conductivity is reduced even at a temperature of about 100° C. The temperature of 100° C. is not a particularly satisfactory environment for various electronic devices but is in a comparatively high temperature range as a temperature at which the device performance is guaranteed. Recently, electronic devices find extensive applications in high temperature environments, such as automotive engine rooms, and the conductivity reduction, i.e., insufficient heat resistance at high temperatures is an undesired factor for the development of devices using conducting polymers. Under these circumstances, heat resistance improvement of conducting polymer has been strongly demanded for expanding the scope of applications of the polymer to electronic devices and further improving the reliability (i.e., long time stability of the conductivity) of the polymer under usual environments as well.

It has been thought that the conductivity of conducting polymers is reduced due to chain-like progress of a series of oxidizing reactions, which is generally caused by a reaction of bonding of oxygen to radicals generated in the main chain of the polymers by dehydrogenation. A heat resistance improvement measure from the standpoint of the prevention of such oxidizing reaction, is disclosed in Japanese Patent Application Kokai Publication No. Hei 4-315412 (hereinafter referred to as Publication 1) or Japanese Patent Application Kokai Publication No. Hei 4-315413 (hereinafter referred to as Publication 2). The disclosed techniques are applied when forming a conducting polymer through electrolytic oxidization polymerization. In these processes, an antioxidant is introduced in polymer formation during the process of the electrolytic oxidization polymerization. According to the publications mentioned above, phenol derivatives are used as the antioxidant. The antioxidant is added to a usual electrolyte solution containing a monomer and a support electrolyte (according to Publication 1), or it is used as the support electrolyte itself (according to Publication 2). A polypyrrole layer is thus formed as a conducting polymer layer. The above processes, however, have a demerit that they are applicable only to the formation of conducting polymers through electrolytic oxidization polymerization and not applicable to the chemical oxidization polymerization which is suited for the fabrication of various electronic devices.

Japanese Patent Application Kokai Publication No. Hei 3-127813 (hereinafter referred to as Publication 3) discloses a process of blocking contact between conducting polymer and oxygen molecules. In this process, not only the ambient atmosphere around the capacitor element of a solid electrolytic capacitor is made (in effect) to be an oxygen-free state, but also oxygen molecules present in cavities in the capacitor element, such as fine pores in sintered pellets, are substituted and filled by inert gas molecules. This process is applicable not only to the electrolytic oxidization polymerization but also to the formation of conducting polymers in the chemical oxidization polymerization process.

According to the technique disclosed in Publication 3 mentioned above, a solid electrolytic capacitor, which is less subject to increase of ESR (i.e., Equivalent Series Resistance) and has excellent heat resistance, is obtainable by either the electrolytic oxidization polymerization process or the chemical oxidization polymerization process. Recently, the performance of electronic devices has been improved remarkably, and the related application fields, i.e., the related operation environments, are extremely diversified. In these circumstances, satisfactory economy is strongly demanded along with the heat resistance improvement for the expansion of the application scope of conducting polymers.

The solid electrolytic capacitors using the above techniques, however, require that the individual steps of capacitor element processing (such as filling with conducting polymer, washing, drying, provision of leads, etc.) be carried out in an inert gas atmosphere, as shown in Publication 3, for instance. If it is difficult to do so due to any problems which relate to the device or process used, it is required that, for example, a capacitor element that is obtained with a film formation metal porous body being filled with conducting polymer in atmosphere, or obtained with a conductive paint being coated and filled therein in atmosphere be held under reduced pressure and, after the air (or oxygen) remaining in the pores in the capacitor element is removed, an inert gas be introduced under the normal pressure or high pressure. This inevitably complicates the process of fabrication, and it is very important for the application scope expansion of conducting polymers to minimize the process complication and increase the performance versus cost ratio of conducting polymers and electronic devices using the same.

SUMMARY OF THE INVENTION

An object of the invention, therefore, is to overcome the problems existing in the prior art and to provide a conducting polymer, which has satisfactory heat resistance, provides for high performance versus cost ratio and is obtainable not only by the electrolytic oxidization polymerization but also by the chemical oxidization polymerization.

Another object of the invention is to provide a solid electrolytic capacitor, which uses a heat resistant conducting polymer as solid electrolyte and has satisfactory heat resistance and high reliability.

A further object of the invention is to provide a method, which permits the production of a solid electrolytic capacitor having high heat-resistance and high reliability through the provision of a relatively simple additional step.

According to one aspect of the invention, there is provided a heat resistant conducting polymer which is for use in a solid electrolytic capacitor and which contains water and has a structure expressed by one of formula

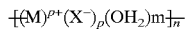

and

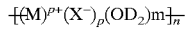

wherein, M represents a unit conjugated system monomer, X represents a well-known ion pair, p represents a non-restrictive number no greater than 0.5, m represents a number of $0.003 < m < 0.05$, and n represents a non-restrictive number no smaller than 2.

According to another aspect of the invention, there is provided a solid electrolytic capacitor comprising a sealed capacitor element having, as a solid electrolyte layer, a heat resistant conducting polymer layer formed on a dielectric oxide film, the heat resistant conducting polymer layer containing water, the sealed capacitor element inside being substantially oxygen-free, and the heat resistant conducting polymer layer being one which contains water and has a structure expressed by one of formula

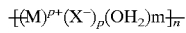

and

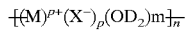

wherein, M represents a unit conjugated system monomer, X represents a well-known ion pair, p represents a non-restrictive number no greater than 0.5, m represents a number of $0.003 < m < 0.05$, and n represents a non-restrictive number no smaller than 2.

According to still another aspect of the invention, there is provided a method for fabricating a solid electrolytic capacitor comprising the steps of:

producing a capacitor element by forming, as a solid electrolyte layer, a heat resistant conducting polymer layer on a dielectric oxide film which is obtained by oxidizing a surface of a valve action metal;

providing a cathode conductive layer on the capacitor element and then mounting both an external cathode lead and an external anode lead on the capacitor element;

supplying water to the heat resistant conducting polymer layer of the capacitor element such that the heat resistant conducting polymer layer inside contains water before being sealed; and sealing the capacitor element mounted with the external leads such that water is held within the heat resistant conducting polymer layer and that the capacitor element inside is substantially oxygen-free.

According to the invention, water is introduced into conducting polymer to utilize the function of water molecules as a hydrogen source. The conductivity reduction of conducting polymer is due to a series of reactions brought about as a result of generation of radicals in the main chain of the polymer by dehydrogenation and bonding of oxygen to the radicals thus generated. The dehydrogenation mentioned above is more active as the temperature becomes higher, and it is observed as a pronounced conductivity reduction of the conducting polymer at high temperatures.

It is the presence of water in low or zero oxygen concentration atmosphere that acts as a hydrogen source to provide hydrogen to the dehydrogenated locality of radicals for the replenishment thereof. Water also acts as a hydrogen source for removing peroxide radicals, which are generated as a result of bonding of oxygen to the dehydrated radical locality. The peroxide radicals bring about dehydrogenation of the main chain. As a result, an oxidizing reaction proceeds as a chain reaction. With temperature increase, more water becomes water vapor, and a greater amount of water molecules fill the system to quickly react with the main chain radical locality and remove peroxide radicals. The more active becomes the dehydrogenation of the main chain at high temperature, the more actively hydrogen molecules are applied to the main chain radical locality. Owing to the presence of water, the conductivity of the conducting polymer thus is not reduced so much even in a high temperature range.

Examples of the conducting polymer are derivatives of conjugated system compounds having π electrons, e.g., polypyrrole derivatives, polyaniline derivatives, polythiophene derivatives, polyphenylene derivatives, polyacetylen derivatives, polyphenylenevinylene derivatives, polyfuran derivatives, polyasem derivatives, polyazulene derivatives, etc., and also copolymers of two or more of these derivatives. Generally, any polymer may be used so long as it shows a conductivity of $10^{-10}$ S/cm or above in the oxidized state. The polymer synthesis may be made by any process, such as a process in which a corresponding monomer is polymerized by chemical oxidization polymerization, a process in which electrolytic oxidization polymerization is made, and a method of synthesis by processing a corresponding precursor polymer.

As the process of introducing water, with a system for synthesizing a conducting polymer from an aqueous solution, it is necessary only to control the drying condition. Other processes that may be used are one in which the drying condition is controlled after dipping the conducting polymer in water, and one in which water vapor is blown against the conducting polymer. In the case of using conducting polymer as part of a constituent element of a device, in addition to introducing water when preparing the element (including the formation of the conducting polymer), such step as control of the humidity of the atmosphere in which to assemble the element into the device may be controlled, may be taken so that the conducting polymer in the device finally has a water content of $5 \times 10^{-2}$ mol % (i.e., 0.1 wt %).

Water contained in the conducting polymer functions as an oxidation reaction promoter in the presence of oxygen. In the case of using the water-containing conducting polymer as a device constituent element, for instance, the electrolyte in a solid electrolytic capacitor, the device is sealed with an epoxy resin or the like so that its inside can be regarded as being substantially oxygen-free, i.e., with an oxygen concentration being less than about 1%. It is also possible to seal the device in a case in an oxygen-free gas stream, of such inert gas as nitrogen, helium or argon, or carbon dioxide. It is further possible to utilize a process, in which water vapor is introduced into such gas stream. Further, the device may be held in air so long as its inside is held substantially oxygen-free. Thus, this may be done by introducing an oxygen absorber into the device.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the drawings and examples as well as comparative examples. Generally the contents of the examples and the comparative examples are:

(1) Characteristic comparison of conducting polymers per se; and (2) Characteristic comparison of tantalum solid electrolytic capacitors using the conducting polymers.

In the characteristic comparison of the polymers per se (1), effects of oxygen molecules were compared with electrolytic oxidation polymerized polypyrrole samples containing water and those free from water. The effects of the invention were confirmed with other polymers than polypyrrole as well. The way of introducing water was further studied.

In the characteristic comparison of the capacitors in (2), a polypyrrole layer obtained by chemical oxidization polymerization was used as solid electrolyte layer, and it was confirmed that the invention is applicable to chemical oxidization polymerized conducting polymers as well. The way of introducing water into the polymer and the way of holding water and shutting off oxygen until completion of the sealing were further studied. The effects of the invention were confirmed with other polymers than polypyrrole as well.

The examples and the comparative examples will now be described in detail.

EXAMPLE 1

Figure 1:
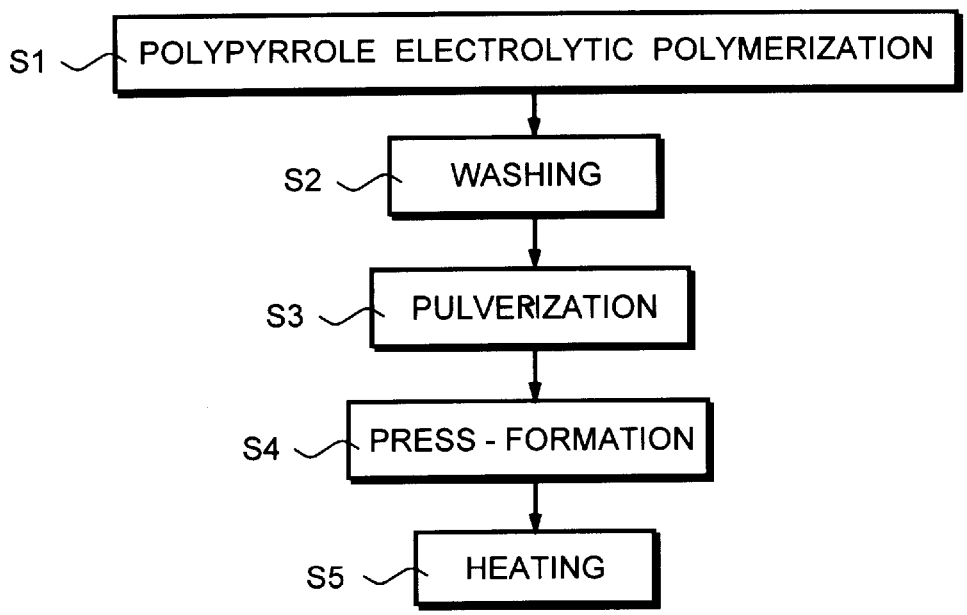
FIG. 1 is a flow chart of sequential process steps of a method of fabrication according to a first embodiment (Example 1) of the invention (FIG. 1 also applies to Comparative Examples 1–3)

FIG. 1 is a flow chart illustrating the process of fabrication in Example 1. Electrolysis at constant current (25 mA) was carried out by using, as polymerizing solution, a blend solution containing 0.1 mol of pyrrole, 0.1 mol of sodium p-toluenesulfonate and Britton-Robinson buffer solution (with a pH of 1.8) and using stainless steel plate electrodes (2 cm×7.5 cm) as working electrode and counter electrode (step S1). The electrolysis was carried out for 20 minutes.

After the electrolysis, a polypyrrole film that was formed on the working electrode was washed with water and acetone (step S2), and it was then stored in a desiccator.

A 7 mg polypyrrole film, separated from the electrode, was pulverized (step S3) and then dried in vacuum at room temperature for 12 hours. Then, the powder was press formed into pellets with a diameter of 10 mm and a thickness of 0.1 mm (step S4). Then, the conductivity $\sigma_0$ of the pellets was calculated from the resistance thereof measured by the four-terminal method.

Then, the pellets were heated in a nitrogen atmosphere with a relative humidity of 70% under a temperature condition of 150° C. for 1,000 hours (step S5). The oxygen concentration in the nitrogen gas was 1% or below. Subsequently, the pellets were dried in vacuum, and then their conductivity $\sigma$ after the heating was measured. The ratio $\sigma/\sigma_0$ of the conductivity $\sigma$ after the heating to the conductivity $\sigma_0$ before the heating was 90%. A high thermal stabilization effect of adding water was recognized. The result of measurement is shown in Table 1.

COMPARATIVE EXAMPLE 1

A sample was produced in the same process as in Example 1 except for that the pellet heating (step S5) was done in nitrogen gas without water content. That is, while in Example 1 the pellet heating was done with water content and without oxygen, in the Comparative Example 1 it was done without water content and also without oxygen.

Then, in the process shown in FIG. 1, dry-polypyrrole was prepared under the same conditions as in Example 1 and then formed into pellets under the same conditions. The pellets were then heated in dry-nitrogen gas (at 150° C. for 1,000 hours), and then the conductivity change was measured. The conductivity ratio $\sigma/\sigma_0$ was 15%. Polypyrrole conductivity reduction by heating was recognized. The result is shown in Table 1.

COMPARATIVE EXAMPLE 2

A sample was produced in the same process as in Example 1 except for that the pellet heating (step S5) was done in an atmosphere with both water and oxygen contents. That is, while in Example 1 the pellet heating was done with water content and without oxygen, in the Comparative Example 2 it was done with both water and oxygen contents.

Then, in the process as shown in FIG. 1 dry-polypyrrole was prepared under the same conditions as in Example 1 and then formed into pellets under the same conditions. The pellets were then heated in nitrogen/oxygen blend gas ($N_2:O_2=4:1$) with a relative humidity of 70% (at 150° C. for 1,000 hours), and then the conductivity change was measured. The conductivity ratio $\sigma/\sigma_0$ was 2%. It was confirmed that the polypyrrole conductivity is reduced by heating in the presence of high humidity oxygen. The result is shown in Table 1.

COMPARATIVE EXAMPLE 3

A sample was produced in the same process as in Example 1 except for that the pellet heating (step S5) was done in an atmosphere without water content and with oxygen. That is, while in Example 1 the pellet heating was done with water content and without oxygen, in the Comparative Example 3 it was done without water content and with oxygen.

Then, in the process as shown in FIG. 1 dry-polypyrrole was prepared under the same conditions as in Example 1 and formed into pellets under the same conditions. The pellets were then heated in dry-nitrogen/oxygen blend gas ($N_2:O_2=$ 4:1) (at 150° C. for 1,000 hours), and the conductivity change was measured. The conductivity ratio $\sigma/\sigma_0$ was 2%, and it was confirmed that the polypyrrole conductivity was reduced greatly by heating in the presence of oxygen.

With reference to Table 1 which collectively shows the results of measurements in Example 1 and Comparative Examples 1 to 3, is obvious from the result in Comparative Example 3 that the presence of oxygen in the atmosphere of polypyrrole heating has very great effects on the polypyrrole conductivity reduction by heating. However, it is obvious from the result in Comparative Example 1 that, although some heat resistance improvement effect is obtainable under the oxygen-free condition, the effect is insufficient. In other words, sufficient heat resistance improvement cannot be obtained by merely holding polypyrrole in an oxygen-free environment.

In contrast, it is obvious from the result in Example 1 that heating polypyrrole under an oxygen-free condition and in the presence of water has an effect of greatly improving the polypyrrole conductivity reduction by heating, indicating that addition of water to polypyrrole has a great effect. However, it is obvious from the result in Comparative Example 2 that the effect of adding water to polypyrrole is lost when oxygen is present together with the added water. Therefore, when utilizing water-containing polypyrrole for a solid electrolytic capacitor or like electronic device, it is necessary to design the device structure and fabrication process such that the polypyrrole surroundings are held in an oxygen-free state in the completed device.

EXAMPLE 2

A sample was produced, which was different from Example 1 mainly in the way of adding water to polypyrrole. The Example 2 is also different from Example 1 in the polymerizing solution when forming polypyrrole.

Figure 2:
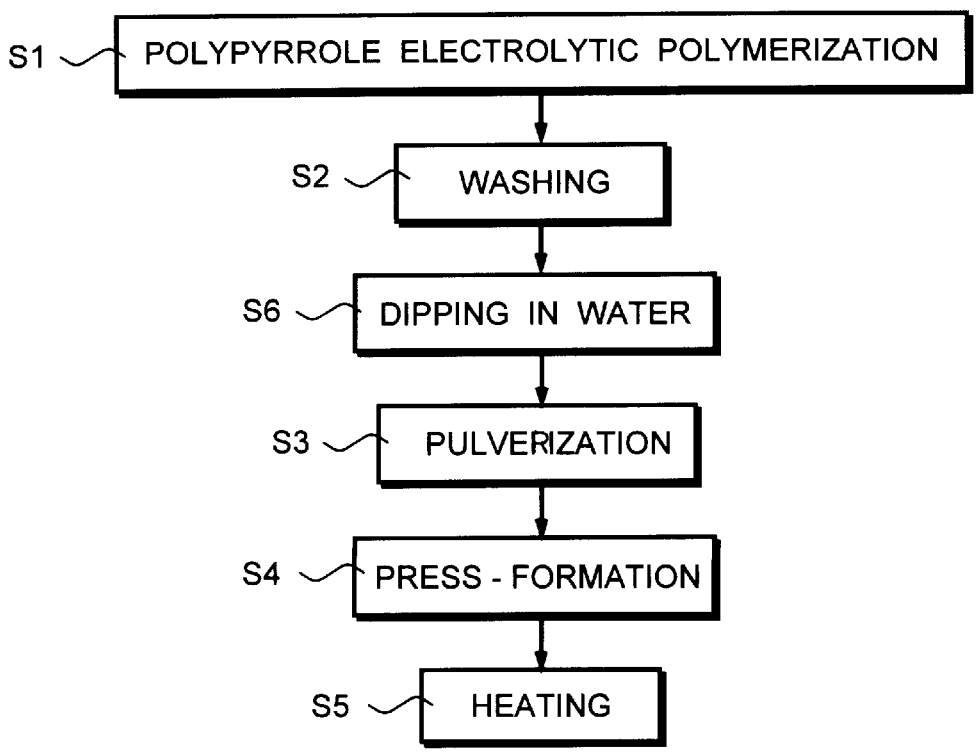
FIG. 2 is a flow chart of sequential process steps of a method of fabrication according to each of second and third embodiments (Examples 2 and 3) of the invention.

FIG. 2 is a flow chart illustrating the process of fabrication in this Example 2. In this example, electrolysis at constant current (25 mA) was carried out by using, as polymerizing solution, a blend solution of an acetonitrile solution containing 0.1 mol of pyrrole, 0.1 mol of ammonium hexafluorophosphate and using stainless steel plate electrodes (2 cm×7.5 cm) as working electrode and opposed electrode (step S1). The electrolysis was carried out for 20 minutes. As the reference electrode, a silver/silver chloride electrode was used. After the electrolysis, polypyrrole generated on the working electrode was washed with acetone and water (step S2), and then dipped again in water (step S6). Then after removing water well, it was left at room temperature for 2 hours. The water content in this polypyrrole was measured at this time by the Curl Fisher method and found to be 0.1 wt %.

Meanwhile, 7 mg of a polypyrrole film separated from the working electrode was pulverized (step S3) and then press formed into pellets with a diameter of 10 mm and a thickness of 1 mm (step S4), and the conductivity $\sigma_0$ of the polypyrrole was calculated from the resistance thereof measured by the four-terminal method. The polypyrrole pellets were then heated in an nitrogen atmosphere with a relative humidity of 70% under a temperature condition of 150° C. for 1,000 hours (step S5). Then the conductivity after the heating was measured after vacuum drying. The conductivity ratio $\sigma/\sigma_0$ was 90%, and a high thermal stabilization effect of adding water was recognized. The result is shown in FIG. 1.

EXAMPLE 3

A sample was produced in the manner as in Example 2 except for that the polypyrrole film formed on the working electrode, having been washed (step S2), was dipped not in water but in heavy water ($D_2O$) in the step S6.

In this example, the conductivity ratio $\sigma/\sigma_0$ was 92%, and a very high thermal stabilization effect of adding water was recognized. The result is shown in Table 1.

EXAMPLE 4

Figure 3:
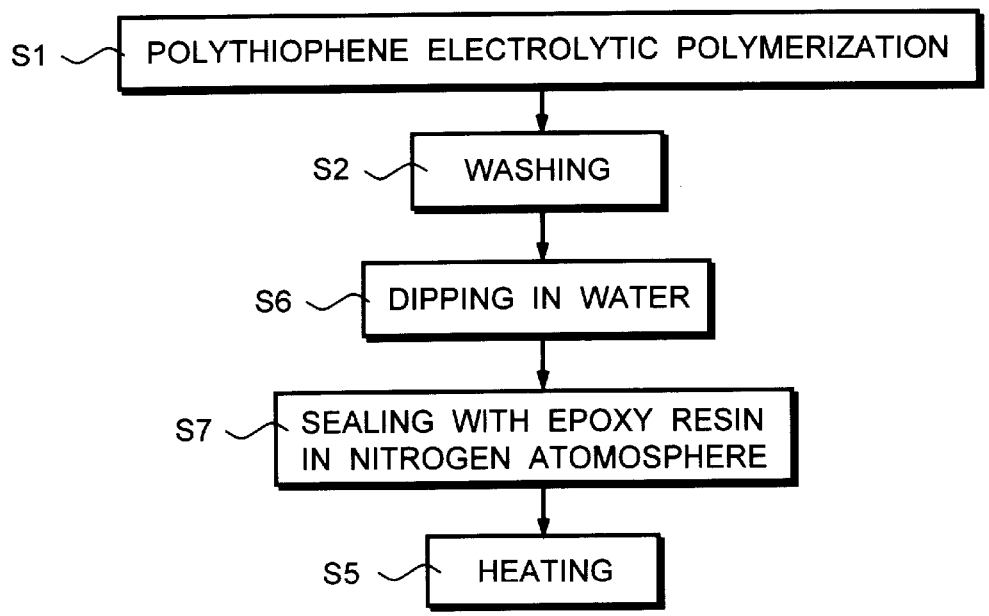
FIG. 3 is a flow chart of sequential process steps of a method of fabrication according to a fourth embodiment (Example 4) of the invention.

By a process as shown in FIG. 3, a sample was produced, which is mainly different from Example 2 that the conducting polymer is polythiophene and also in the way of blocking the contact between polythiophene and oxygen molecules.

Specifically, electrolysis at constant current (25 mA) was carried out by using, as polymerizing solution, a blend solution of an aqueous solution (with pH of 2.0) containing 0.1 mol of thiophene and 0.1 mol of sodium dodecylsulfate and using stainless steel plate electrodes (2 cm×7.5 cm) as working electrode and counter electrode (step S1). The electrolysis was carried out for 20 minutes. As the reference electrode, a saturated calomel electrode was used. After the electrolysis, polythiophene generated on the working electrode was washed by water and acetone (step S2).

A polythiophene film separated from the working electrode was formed into disks with a diameter of 10 mm, which were then dipped in water (step S6). Afterwards, after removing water well, the disks were left for 2 hours. The film contained 0.1 wt % of water.

Then, excess water in the polythiophene film was removed using filter paper, and then it was sealed using an epoxy resin in a state of being held clamped between two stainless steel plates in a nitrogen atmosphere (step S7). The resulted structure was then heated in a thermostatic chamber trough in an air atmosphere under a temperature condition of 180° C. for 1,000 hours to measure the resistances before and after the heating. No resistance increase by heating was observed, and a very high thermal stabilization effect of the presence of added water was recognized. The result is shown in Table 1.

Referring to Table 1 collectively showing the results of measurements in Examples 2 to 4, it is obvious from the result in Example 2 that polypyrrole which is formed using different polymerizing solutions shows like heat resistance improvement effect owing to the content of water. In addition, it is obvious that water may be added not only by the process of exposing the polymer layer to water-containing inert gas atmosphere (Example 1) but also by the process of dipping the layer in water and then controlling the drying condition. Besides, it is seen from the result in Example 3 that water may be added by using not only water but also heavy water. It is further seen from the result in Example 4 that the conducting polymer is not limited to polypyrrole but may be polythiophene as well. Furthermore, it suggested from the results in Examples 1 and 4 that in the case of utilizing the conducting polymer for a device, the element including the polymer may be sealed in inert gas or resin sealed.

EXAMPLE 5

Figure 4A:
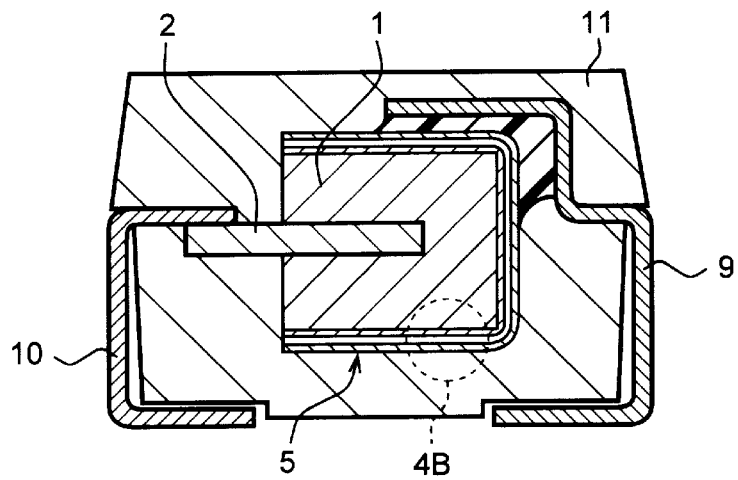
FIGS. 4A and 4B are diagrammatic sectional views of a tantalum solid electrolytic capacitor according to each of fifth and sixth embodiments (Examples 5 and 6) of the invention (FIGS. 4A and 4B also apply to Comparative Example 3).
Figure 4B:
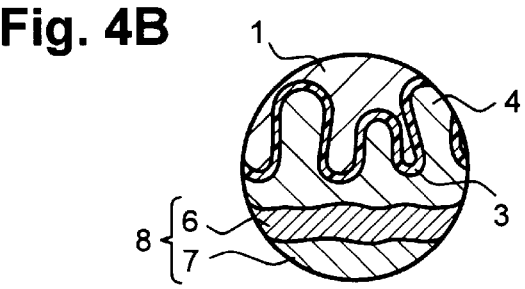

A tantalum solid electrolytic capacitor using a chemical oxidization polymerized polypyrrole layer as a solid electrolyte layer was produced, which has a sectional structure as shown in FIGS. 4A and 4B.

Specifically, tantalum powder was formed into a cylindrical body (2×3×1 mm³), which was then sintered to obtain a sintered tantalum pellet 1. The pellet 1 has a lead 2 which was preliminarily embedded in it when it was formed. The pellet 1 was oxidized by anodic oxidization in an aqueous solution of a phosphoric acid at 11.5 V, thus forming a film 3 of tantalum oxide ($Ta_2O_5$).

A capacitor element 5 was produced by forming a polypyrrole film 4 on the tantalum oxide film 3. The polypyrrole film 4 was formed by chemical oxidization polymerization. Specifically, a series of operations of polypyrrole formation of dipping the pellet 1 in a 0.1 mol pyrrole solution, then dipping the pellet in an ether solution containing 0.4 mol of anhydrous ferric chloride ($FeCl_3$) as oxidizer, and then drying, was executed repeatedly five times.

The capacitor element 5 thus formed was vacuum dried for 3 hours and then held exposed to a nitrogen atmosphere with a relative humidity of 70% for one hour.

Then, a cathode conductive layer 8 formed of a graphite layer 6 and a silver paste layer 7 was formed on the polypyrrole film 4 in succession. Afterwards, external cathode and external anode leads 9 and 10 were mounted on the cathode conductive layer 8 and the anode lead 2, respectively.

The capacitor element with the external cathode and external anode leads 9 and 10 was then held exposed to a nitrogen stream with a relative humidity of 70% for 6 hours, and then sealed with epoxy resin 11 for transfer formation, thus completing the tantalum solid electrolytic capacitor in this example.

The capacitor thus obtained was heated in air under a temperature condition of 150° C. for 1,000 hours, and then the capacitor characteristic change before and after heating was measured. As the characteristics of the capacitor, the electrostatic capacitance C at a frequency of 120 Hz, dielectric tangent tan δ, ESR at 100 kHz and frequency characteristic of the impedance were measured. The ratio tan $\delta$/tan $\delta_0$ and ESR/$ESR_0$ between the values of the dielectric tangent and the ESR before and after the heating were 1.1 and 1.2, respectively. As for the frequency characteristic of the impedance, no change after the heating was observed. The capacitor in this example had high heat resistance. The result of measurement is shown in Table 2.

COMPARATIVE EXAMPLE 3

Using a capacitor element produced under the same conditions as in Example 5, the same tantalum solid electrolytic capacitor as Example 5 was produced except for that the exposure of the capacitor element to the nitrogen-containing gas after production and that before the resin sealing were omitted.

Specifically, the capacitor element 5 produced under the same conditions as in Example 5 was vacuum dried for 3 hours, and then a graphite layer 6 and a silver paste layer 2 were formed on the polypyrrole film 4. Further, external cathode and anode lead terminals 9 and 10 were mounted, and then the resultant system was sealed with resin 11, thus completing the tantalum solid electrolytic capacitor in this comparative example.

The capacitor thus obtained was heated under the same conditions as in Example 2, and then changes in capacitor characteristics after the heating were measured. The capacitor characteristic items and conditions of measurement were the same as in Example 5. The dielectric tangent ratio tan $\delta$/tan $\delta_0$ and ESR/$ESR_0$ were 115 and 52.9. The ESR change is mostly due to the polypyrrole conductivity change, so ESR/$ESR_0 \approx \sigma/\sigma_0 = 52.9$. That is, $\sigma/\sigma_0 = 1/52.9 = 0.02$, indicating great reduction of the conductivity of polypyrrole by the heating thereof. The result of measurement is shown in Table 2.

EXAMPLE 6

Using the capacitor element produced under the same conditions as in Example 5, a tantalum solid electrolytic capacitor was produced, which was the same as Example 5 except for the conducting polymer and the way of adding water to the polymer layer.

Specifically, a tantalum sintering pellet 1 ($2\times3\times1$ $mm^3$) was produced under the same conditions as in Example 5 and then subjected to anodic oxidization in an aqueous solution of phosphoric acid and at 11.5 V to form a tantalum oxide film.

A polyaniline film 4 is formed through chemical oxidization polymerization on the pellet 1, thus obtaining a capacitor element 5. As the chemical oxidization polymerization solution, an aniline solution and 2N hydrochloric acid containing ammonium persulfate as an oxidizer were used, and a series of operations of filing and oxidizing monomer by dipping the capacitor element alternately in these solution were carried out.

The capacitor element 5 with the polyaniline film 4 formed thereon was held dipped in water for 2 hours.

Afterwards, a graphite layer 6 and a silver paste layer 7 were formed, and then external cathode and external anode leads 9 and 10 were mounted.

Further, transfer formation was made in a water-containing carbon dioxide gas stream and then sealed with epoxy resin 11, thus obtaining the tantalum solid electrolytic capacitor in this example.

The capacitor was then heated in air at a temperature of 150° C. for 1,000 hours, and the capacitor characteristic changes before and after the heating were measured. The items and conditions of the characteristic measurements were the same as in Example 5. The dielectric tangent ratio tan $\delta$/tan $\delta_0$ and ESR ratio ESR/$ESR_0$ were 1.1 and 1.1, indicating that there were substantially no changes in the dielectric tangent and ESR before and after the heating. It was further confirmed that the impedance frequency characteristic curve is not substantially changed after the heating, indicating high heat resistance of the capacitor. It is seen that in this example, the conducting polymer may be polyaniline, and it is possible to use carbon dioxide gas instead of nitrogen gas for the blocking of the contact between the capacitor element and nitrogen molecules. The results of measurements are shown in Table 2.

Referring to Table 2 which collectively shows the results of measurements in the Examples 5 and 6 and Comparative Example 3, the process of the conducting polymer formation is not limited to electrolytic oxidization polymerization but may be chemical oxidization polymerization as well. The heat resistance improvement effect by adding water is recognized not only with polypyrrole or polythiophene but also with polyaniline.

TABLE 1

| Conductivities after and before heating ($\sigma/\sigma_0$) | |
|---|---|
| | $\sigma/\sigma_0$ |
| Example 1 | 0.90 |
| Comparative Example 1 | 0.15 |
| Comparative Example 2 | 0.02 |
| Comparative Example 3 | 0.02 |
| Example 2 | 0.90 |
| Example 3 | 0.92 |
| Example 4 | 1.00 | wherein, in the case of Example 4, the values are resistivities after and before heating.

TABLE 2

| | Changes in capacitance characteristics by heating (after/before heating) | | |
|---|---|---|---|
| | $C/C_0$ | $\tan \delta / \tan \delta_0$ | $ESR/ESR_0$ |
| Example 5 | 0.87 | 1.1 | 1.2 |
| Comparative Example 3 | 0.20 | 115 | 52.9 |
| Example 6 | 0.85 | 1.1 | 1.1 |

The conducting polymers containing water in the Examples above are respectively expressed by the following chemical formula:

In the case of Example 1 (polypyrrole),

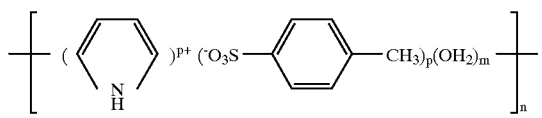

wherein, p=0.3 and m=0.0037.

In the case of Example 2 (polypyrrole),

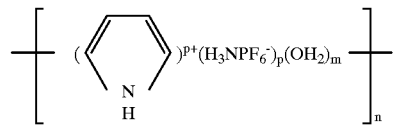

wherein, p=0.3 and m=0.0037.

In the case of Example 3 (polypyrrole),

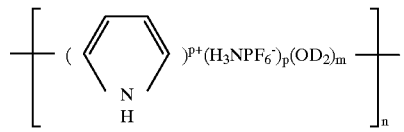

wherein, p=0.3 and m=0.0037.

In the case of Example 4 (polythiophene)

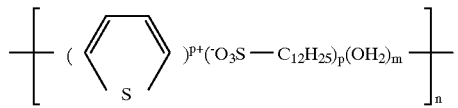

wherein, p=0.2 and m=0.0047.

Example 5 (polypyrrole)

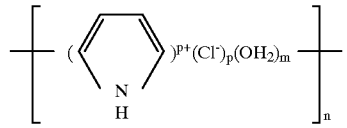

wherein, p=0.3 and m=0.0037

Example 6 (polyaniline)

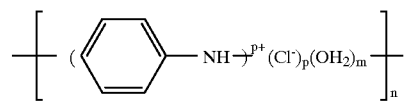

wherein, p=0.4 and m=0.0051

Any of the conducting polymers used in the Examples exhibit conductivity owing to a conjugated double bond having π electrons. According to the invention, the conducting polymers used in the above examples are by no means limitative, it is possible to obtain the same heat resistance improvement effect as in the above examples with any water-containing conjugated system conducting polymer expressed by the formula given below. Other well-known examples of such conjugated system conducting polymer are polyphenylene, polyacetylene, etc.

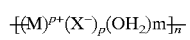

or

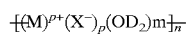

wherein, M represents a unit conjugated system monomer, X represents a well-known ion pair, p represents a non-restrictive number no greater than 0.5, m represents a number of 0.003<m<0.05, and n represents a non-restrictive number no smaller than 2.

With the process of capacitor fabrication in the above examples of the invention, a solid electrolytic capacitor having satisfactory heat resistance and high reliability is obtainable by merely dipping a capacitor element with a layer of polypyrrole or like conducting polymer in water or heavy water or exposing the element to a water-containing inert gas. In other words, for purposes of blocking the contact between conducting polymer and oxygen molecules, the process requires no such complicated procedures as carrying out the individual capacitor element production steps (such as filling, washing and drying of conducting polymer and further mounting of leads) in an inert gas atmosphere or removing air (or oxygen) remaining in cavities of the capacitor element which has been produced in air with or without subsequent coating and impregnating with a cathode conductive layer by holding the element under reduced pressure and then introducing an insert gas under normal or reduced pressure.

In Example 5 above, in addition to the exposure of the capacitor element to a water-containing nitrogen gas atmosphere after production of the element, the element is exposed again to the water-containing nitrogen gas after the mounting of the external cathode and external anode leads and before the sealing of the element with an epoxy resin in order to replenish with water evaporated in the step of mounting the external leads. These two steps of exposure to water-containing inert gas are not always necessary, but only either one of them is needed. From the consideration of the fact that in this type of the solid electrolytic capacitor it is usual that substantially the entire surface of the conducting polymer layer is covered by the cathode conductive layer, however, it is thought that it is better to add water in the first exposure step right after the production of the capacitor element.

As has been described in the foregoing, according to the invention water is added to the conducting polymer in a simple step of dipping the polymer in water or heavy water or exposing the polymer to a water-containing inert gas atmosphere. With this step, it is possible to provide a conducting polymer, which can exhibit high heat resistance when placed in an oxygen-free atmosphere.

The solid electrolytic capacitor according to the invention, while using the above water-containing conducting polymer as solid electrolyte, is constructed such that its inside is substantially oxygen-free. Thus, its dielectric tangent or ESR is less changed with the lapse of time when it is held in a high temperature environment, so that it exhibits high heat resistance.

With the process of solid electrolytic capacitor fabrication according to the invention, a solid electrolytic capacitor having excellent heat resistance can be obtained by merely adding a simple step of dipping a capacitor element having a conducting polymer layer in water or heavy water or exposing the element to water-containing inert gas or switching the atmosphere when sealing the element with an epoxy resin or in a can case over to oxygen-free inert gas. The solid electrolytic capacitor according to the invention thus permits obtaining excellent performance versus cost ratio.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. An electronic device comprising a sealed capacitor element having a solid electrolyte layer comprising a heat resistant conducting polymer layer formed on a dielectric oxide film, said heat resistant conducting polymer layer containing water, said sealed capacitor element inside being substantially oxygen-free, and said heat resistant conducting polymer layer being one which contains water and has a structure expressed by one of formula

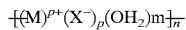

and

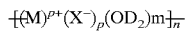

wherein, M represents a unit π-electron conjugated system monomer, X represents an anion of an acid or salt used to protonate said polymer, p represents a number no greater than 0.5, m represents a number of 0.003<m<0.05, and n represents a number no smaller than 2.

2. The method according to claim 1, wherein said heat-resistant conducting polymer has a structure expressed by one of formula:

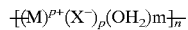

and

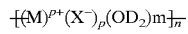

wherein, M represents a unit π-electron conjugated system monomer, X represents an anion of an acid or salt used to protonate said polymer, p represents a number no greater than 0.5, m represents a number of 0.003<m<0.05, and n represents a number no smaller than 2.

3. The method according to claim 2, in which the step of supplying water is provided after the step of producing said capacitor element and which includes the step of dipping said capacitor element mounted with said external leads into one of water and heavy water.

4. The method according to claim 2, in which the step of supplying water is provided after the step of producing said capacitor element and includes the step of exposing said capacitor element mounted with said external leads to a water-containing inert gas atmosphere.

5. The method according to claim 2, in which the sealing of the capacitor element after the mounting of the external leads is carried out in a water-containing oxygen-free inert gas atmosphere.

6. The method according to claim 2, in which said conducting polymer is selected from a group of conjugated system compound derivatives consisting of polypyrrole derivatives, polythiophene derivatives, polyphenylene derivatives, and polyacetylene derivatives.

7. A method for fabricating an electronic device comprising the steps of:

producing a capacitor element by forming, as a solid electrolyte layer, a heat resistant conducting polymer layer on a dielectric oxide film which is obtained by oxidizing a surface of a valve action metal;

providing a cathode conductive layer on said capacitor element and then mounting both an external cathode lead and an external anode lead on said capacitor element;

supplying water to said heat resistant conducting polymer layer of the capacitor element mounted with said external leads such that said heat resistant conducting polymer layer inside contains water before being sealed; and sealing said capacitor element mounted with said external leads such that water is held within said heat resistant conducting polymer layer and that said capacitor element inside is substantially oxygen-free.

* * * * *